US006050116A

United States Patent [19]

Cole

[11] Patent Number: 6,050,116

[45] **Date of Patent: *Apr. 18, 2000**

[54] METHOD AND APPARATUS FOR A LOCKING DEVICE

[75] Inventor: Clayton K. Cole, Kalamazoo, Mich.

[73] Assignee: Load Defender Incorporated, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/130,525

[22] Filed: Aug. 4, 1998

[51] Int. Cl.[7] .................................................... B60R 25/00

[52] U.S. Cl. .............................. 70/256; 70/275; 292/144; 292/DIG. 32

[58] Field of Search ............................. 70/275–279, 256, 70/257, 263, 264; 292/DIG. 32, 144

[56] References Cited

U.S. PATENT DOCUMENTS

| | | | |
|---|---|---|---|
| 2,466,855 | 4/1949 | Lauver | 292/144 |
| 2,709,610 | 5/1955 | Chandler | 292/144 X |
| 3,601,453 | 8/1971 | Silverman | 292/DIG. 32 X |
| 3,614,147 | 10/1971 | Spector | 292/DIG. 32 X |
| 3,933,382 | 1/1976 | Counts et al. | 292/144 |
| 3,950,018 | 4/1976 | Pickering | 292/144 |
| 4,021,066 | 5/1977 | McShane | 292/144 |
| 4,726,203 | 2/1988 | Komura | 70/275 X |
| 4,782,674 | 11/1988 | Johnson | 292/DIG. 32 X |
| 4,866,963 | 9/1989 | Leininger et al. | 70/256 X |
| 5,062,669 | 11/1991 | McManigal et al. | 292/DIG. 32 X |
| 5,420,568 | 5/1995 | Iida et al. | 70/256 X |
| 5,532,521 | 7/1996 | Leininger | 70/256 X |
| 5,685,578 | 11/1997 | Schneider | 292/144 |
| 5,791,179 | 8/1998 | Brask | 292/144 X |

FOREIGN PATENT DOCUMENTS

| | | | |
|---|---|---|---|
| 2062741 | 5/1981 | United Kingdom | 70/267 |

*Primary Examiner*—Suzanne Dino Barrett
*Attorney, Agent, or Firm*—Robert V. Wilder

[57] ABSTRACT

A method and apparatus is provided for securing trailer doors against tampering. In one exemplary embodiment, a locking device is mounted on the inside of a trailer door. The device includes a locking bolt which is selectively operated by a pneumatic valve in response to a signal selectively generated by an operator. In the example, the locking device is normally in a locked position and the locking bolt is effective to secure the trailer doors to the frame of the trailer. An operator selectively causes the generation of an "unlock" signal through the use of a wireless control device. The unlock signal, in turn, operates upon an electro-pneumatic valve device to effect an application of locally available high air pressure to a locking bolt actuator assembly. The air pressure is sufficiently high to effect the movement of a relatively heavy locking bolt out of a locking position, at which time the trailer doors may be opened for access to the trailer load. In the example, the application of the air pressure is for a predetermined time period after which the air pressure is removed and the locking bolt is returned to a locking position.

15 Claims, 3 Drawing Sheets

FIG. 1
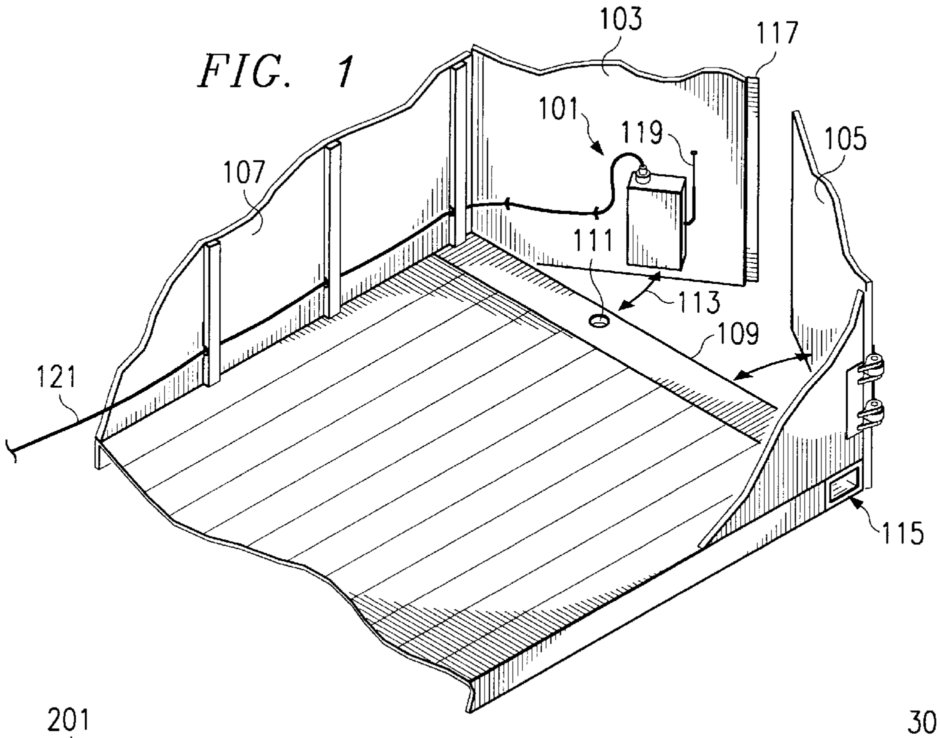
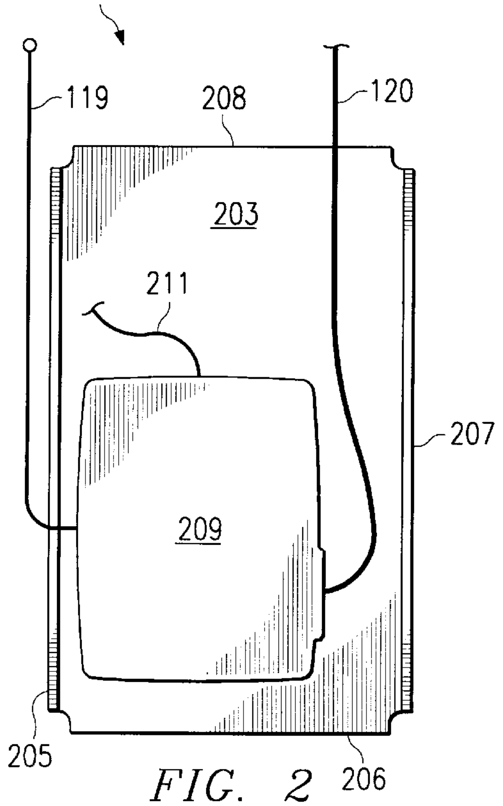
FIG. 2
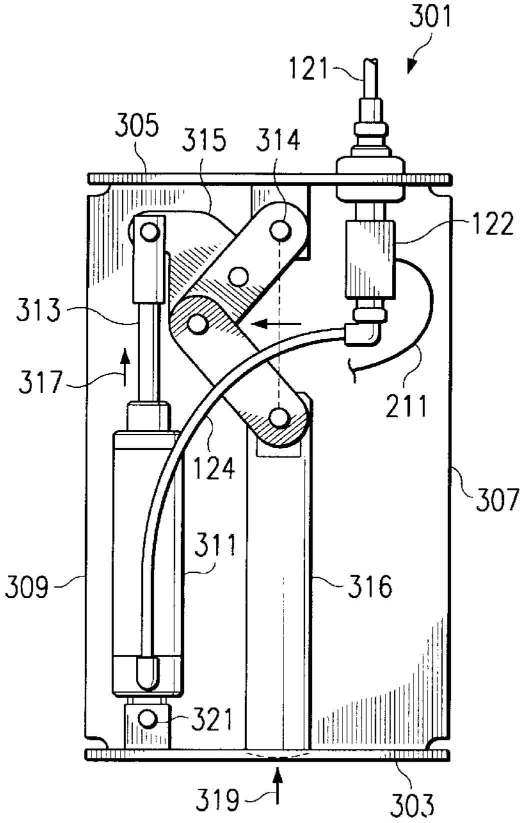
FIG. 3

METHOD AND APPARATUS FOR A LOCKING DEVICE

FIELD OF THE INVENTION

The present invention relates generally to mechanical locking techniques and more particularly to a selectively actuated locking mechanism and methodology.

BACKGROUND OF THE INVENTION

The commercial freight transportation market is enormous and continues to expand every year. According to some industry estimates, in 1996 the U.S. market had aggregate revenues of $451 Billion. The trucking or motor carrier segment earned about $342 Billion or about 76% of the total commercial freight transportation market. The North American Free Trade Agreement has also expanded the North American freight market. Similar growth trends can be observed in both developed and developing countries all over the world.

However, along with the growth of the freight carrier industry comes an alarming increase in the number of instances of cargo theft. Although cargo theft has always been a problem, it is increasing at a disproportionately high rate, to a level which is becoming unacceptable to the trucking industry and also to the cargo insurance carriers. This is at least partly due to the increased value of shipments which may include electronic devices needed to meet the demands of an ever expanding electronics market.

Examples of such electronic devices include personal computers, cellular phones, pagers, high definition television, hand-held and other video cameras and similar highly-valued but small and compact electronic devices. Such small but expensive devices can easily be removed and carried away from a freight carrier or trailer while a driver is merely taking a rest break.

The transportation industry has recently begun to take appropriate action to overcome this growing problem. For example, at the May 1998 Annual Conference of Transportation Loss Prevention and Security Council, the subjects addressed included many cargo or load security issues. Law enforcement agencies are also exchanging cargo theft information and developing working relationships among various agencies in order to be more effective in fighting cargo load theft.

Another resource in fighting load theft is the locking device which is installed on trailer to lock-up the load. Although the load lock itself is obviously the first line of defense, it has received little if any attention in the past with regard to lock improvements. Typically, the back doors of a trailer close with one over-lapping the other, and the trailer load lock consists of a metal arm on the outside of the overlapping door which is manually rotated to a closed position securing both doors together. Typically, the rotating locking arm is secured in place by means of only a padlock device. Such locking devices and others currently in use are relatively easily and quickly removed to allow quick access to the load inside the trailer. Thus, there is a need for an improved load locking device for use on trailer and other doors, and which is effective to provide increased security against lock-tampering and load theft.

SUMMARY OF THE INVENTION

A method and apparatus is provided for securing trailer doors against tampering. In an exemplary embodiment, the device includes a locking bolt which is selectively operated by an electro-pneumatic valve in response to a signal selectively generated by an operator. An operator selectively causes the generation of an "unlock" signal in the example through the use of a wireless control device. The unlock signal, in turn, operates upon an electro-pneumatic valve device to effect an application of locally available high air pressure to a locking bolt actuator assembly. The air pressure is sufficiently high to effect the movement of a relatively heavy locking bolt out of a locking position. In the example, the application of the air pressure is for a predetermined time period after which the air pressure is removed and the locking bolt is allowed to return to its normally locked position.

BRIEF DESCRIPTION OF THE DRAWINGS

A better understanding of the present invention can be obtained when the following detailed description of a preferred embodiment is considered in conjunction with the following drawings, in which:

FIG. 1 is a schematic perspective view of the locking device mounted on the inside door of a trailer;

FIG. 2 is a schematic illustration of a top section of the locking device of FIG. 1;

FIG. 3 is a schematic illustration of a base section of the locking device of FIG. 1;

DETAILED DESCRIPTION

Figure 4:
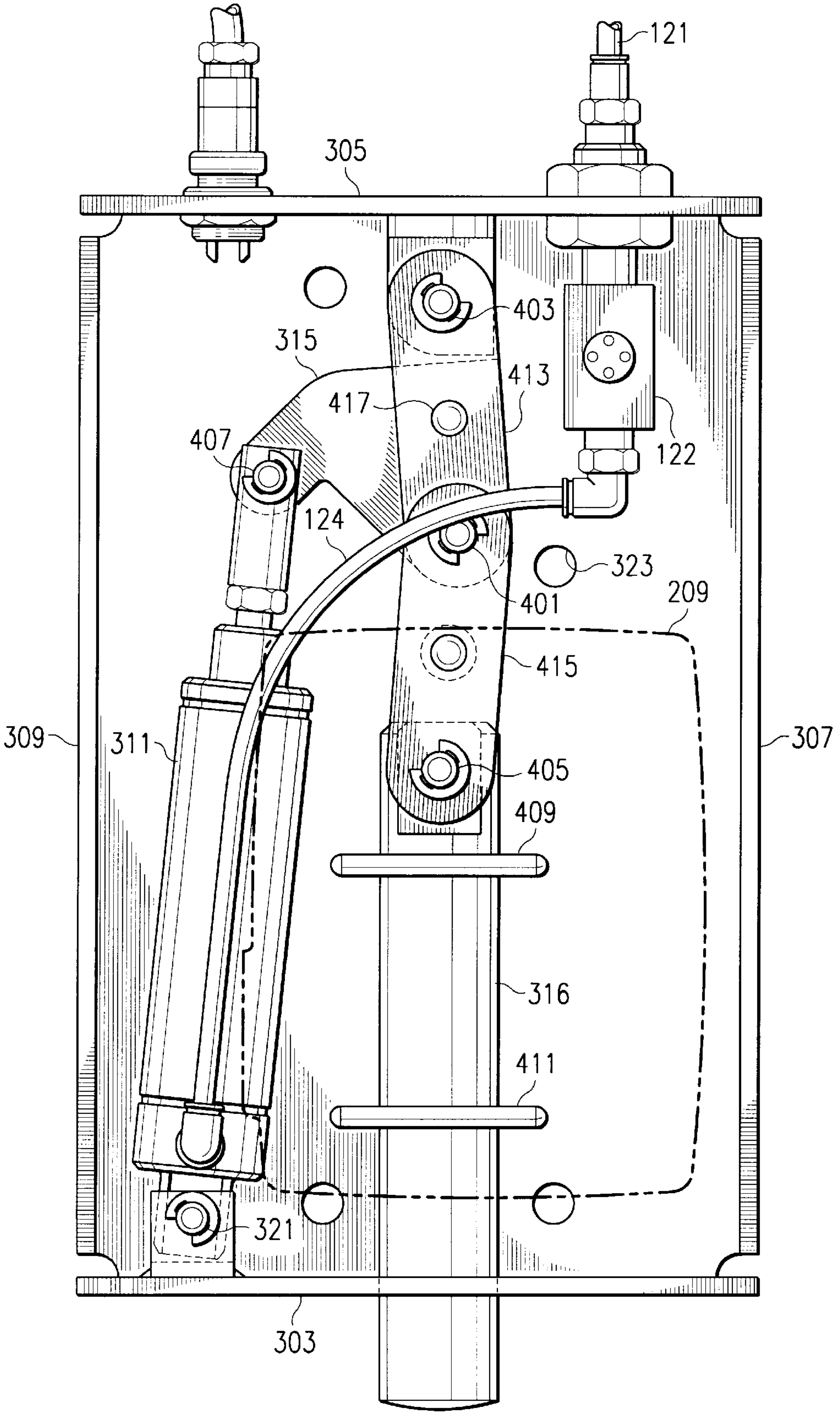
FIG. 4 is a more detailed drawing of the components of the locking device illustrated in FIG. 1 when the device is in an "closed" or "locked" position.

With reference to the Figures, it is noted that like numerals designate like parts although all of the identifying numerals are not illustrated in all of the drawings in order to maintain drawing clarity and to avoid obfuscation of the disclosed examples.

In FIG. 1, a locking device 101 is shown mounted on the inside of a trailer door 103. A second trailer door 105 is illustrated and is arranged to close inside of the first door 103 whereby a locking overlap 117 on the first door 103 is effective to hold the second door in the closed position when the first door is closed 113. The locking device in the example is attached to the first door in a secure manner such as by welding the locking device 101 to the door 103. The locking device may also be bolted securely to the door 103 if desired. Other locking device arrangements are also possible and the trailer doors may each have a locking device installed if desired.

The cut-away view of FIG. 1 also shows the side 107 of the trailer and a back edge or base threshold 115. The base 115 is generally constructed of metal and formed to enclose an open volume 115. In the example, a bolt-retaining receptacle 111 is illustrated and arranged to receive a locking bolt which is selectively extended from the bottom portion of the locking device 101 when the first door 103 is closed 113. The locking device includes a wireless signal converter which receives an activation signal (which is an "open" or "unlock" signal in the present example) through an antenna 119 extending from the locking device 101.

The locking device 101 is operable in response to the activation signal to effect the application of air pressure to open the locking bolt i.e. to lift the locking bolt from the receptacle 111 and pull the locking bolt back into the locking device 101 at which time the doors of the trailer may be opened. In the present example, the air pressure which is applied to open the locking bolt, is applied for a predetermined period of time during which the operator may open the trailer doors. After the predetermined time period, the air supply is cut-off and the bolt is released and allowed to drop to a position extending from the bottom of the locking device 101. The air pressure is supplied through an air hose or conduit 121 from a pressurized air supply on the trailer. The air supply is standard equipment on large trailers but a separate air supply may also be used if necessary or desirable. A cable connection to a vehicle battery or other source of power may also be connected to the locking device to provide a source of power to operate an air valve 122 if needed, in response to an operated generated "lock-unlock" control signal.

In FIG. 2, there is shown a top portion 201 of the locking device 101. The top portion includes a top surface 203, flat side edges 206 and 208 and extended side walls 205 and 207 which are illustrated in darker lines. The extended side walls 205 and 207 are designed to extend several inches across the width of the locking device 101 for connection to corresponding edges of a base or bottom portion 301 (FIG. 3) of the locking device 101. The base portion of the locking device 101 as shown in FIG. 3 includes extended side walls on the alternate two sides for connection to the top portion 201 shown in FIG. 2. The extended wall 205 includes an opening to enable an electrical connection from the antenna 119 to a signal converter 209. The top portion shown in FIG. 2 and the base portion as shown in Figure may be secured together by any of a plurality of well known methods.

FIG. 2 also illustrates an electronic converter device 209 which receives the remotely generated activation signal through the antenna 119 and also a power connection 120 from a vehicle battery or other source of power. The electronic converter provides an operating signal which, in turn, causes power to be applied to an electro-pneumatic valve device 122 (FIG. 3) through an electrical cable 211. The purpose of the electronic converter is to convert the activation signal to a form which may be utilized by an electro-pneumatic valve 122 to control the application of air pressure to operate a locking bolt. In the present example, a remote unit similar to a remotely controlled garage door opener or car door opener was used to generate an operating signal which, in turn, is ultimately effective to cause a locking device to lock and unlock. The converter device also includes an electrical timing device or timer (not shown) which is effective to shut down the "open" signal after a predetermined period of time after it is initially generated. Such timers are commercially available and well known in the art. In the present example, a four second time delay was implemented. If a driver or operator does not open the cargo door within the four second open period, the operator may hit the open button again and generate another "open" signal. The time delay may be set to different settings to suit particular needs depending on the application. This arrangement in the example ensures that the lock will normally be in a locked position, and that the lock will automatically return to a normally locked position in case a vehicle operator becomes otherwise occupied after generating an "open" command on the remote control unit. Locking device control signals are received through the antenna 119 and applied to the converter 209 which in turn is effective to selectively apply power to the electro-pneumatic valve 122 to control the application of air pressure to the air cylinder 311.

In order to provide a secure locking mechanism for a trailer door, a substantial bolt is implemented. Typically such a bolt is on the order of one-half to two inches or more in diameter and several inches in length depending upon the specific application. This relatively massive bolt is extremely difficult if not impossible to move using electronics and is best operated by air pressure as is illustrated herein. The massiveness of the locking bolt is necessary to provide adequate locking security and the bolt mass is also utilized in the example to provide a normally closed arrangement through the pulling force of the weight of the locking bolt in combination with a spring loaded cylinder.

In FIG. 3, the base portion or unit 301 of the locking device 101 is schematically illustrated. The base unit 301 includes flat side edges 307 and 309 and extended side walls 303 and 305 which are arranged to connect to the top portion 201. The extended side walls 303 and 305 include appropriate openings to accommodate the connection of the air line 121 and to allow for the movement the locking bolt 316 of the locking device 101. As shown in FIG. 3, the locking device is in the "open" position with the locking bolt fully withdrawn into the locking device 101.

As shown, the cable 211 from the signal converter 209 is connected into an electro-pneumatic valve device 122 which is responsive to the electrical signals applied to assume either an open position, to allow the passage of pressurized air from the air line 121, or a closed position, to block the air pressure at the valve 122. Another air line 124 is connected between the electro-pneumatic valve device 122 and an air cylinder 311. Upon the application of air pressure from the valve 122, the air cylinder is effective to force the movement of an actuating rod 313 outwardly and away from the body of the air cylinder 311 as illustrated at 317. The movement of the actuating rod 313, in turn, causes a connected actuating arm or bracket 315 to pivot against a stationary reference pin 314 (i.e. stationary relative to the base portion 301) in a direction as indicated to pull-up 319 the locking bolt 316 into an "open" or "unlocked" position. In the example, the cylinder is allowed to pivot about another stationary reference pin 321 to accommodate movement of the cylinder 311 during operation of the actuating rod 313 and the actuating arm 315.

Figure 5:
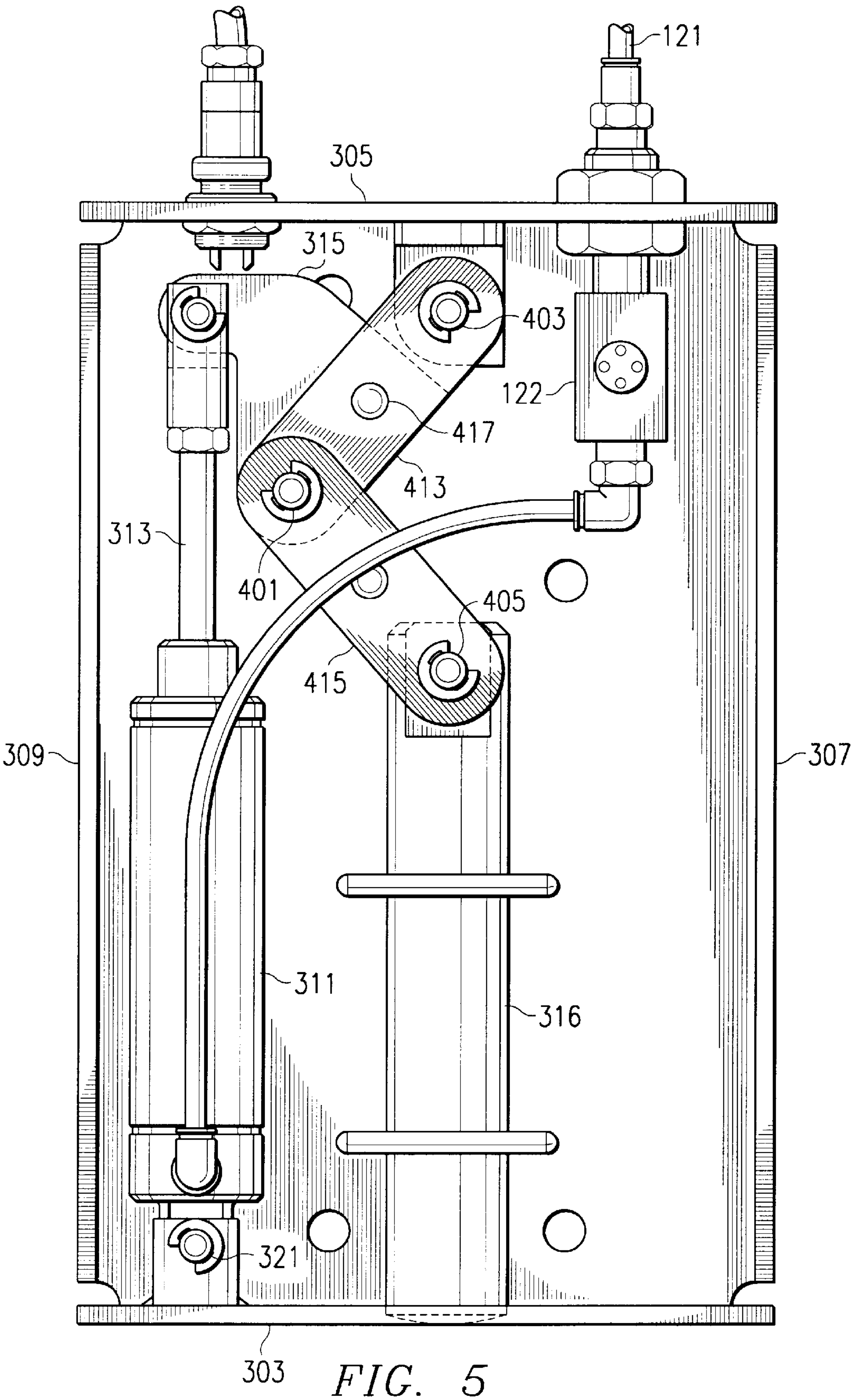
FIG. 5 is a detailed drawing of the components of the locking device illustrated in FIG. 1 when the device is in a "retracted" or "unlocked" position.

FIG. 4 and FIG. 5 show more detailed views of the locking device 101 in its normal mounted vertically oriented position. FIG. 4 illustrates the locking device in a "locked" position with the locking bolt 316 extended outwardly beyond the bottom side 303 in a position to engage the receptacle 111 (FIG. 1) thereby locking the trailer door, to which the locking device is attached, in a closed and locked position. The electrical connection 211 from the antenna 119 to the valve 122 is not shown for the sake of clarity. It is noted that in the locked position, air pressure is not applied to cylinder 311 and the actuating rod 313 (FIG. 3) is withdrawn into the cylinder 311. Without the application of air pressure, the weight of the relatively massive locking bolt 316 pulls the bolt downwardly. To assist in this action, the cylinder 311 is spring loaded such that the actuating rod 313 is normally held within the cylinder 311 as shown in FIG. 4. The spring-loaded cylinder 311 thus forces an alignment or straightening of bolt actuating elements or members 413 and 415. The locking device is prevented from being forced open by the application of an upward mechanical force to the locking bolt 316 since such an application of force will cause the actuator or actuating member 315 to rotate counterclockwise which tends to force the actuating rod 313 downwardly. However, when the locking device is in the locked position as shown in FIG. 4, the actuating rod 313 is abutted against the cylinder 311 and unable to move any farther into the cylinder 311. Therefore, the application of a mechanical force to lift the locking bolt 316 will be ineffective. Actuating elements 413 and 415 are coupled together by pin 401 to allow each member to rotate about the pin 401.

Stationary pin 403 provides a reference point for the pivoting action of the various actuating elements 413 and 415 as well as the actuating arm 315. Actuating arm 315 is also pivotally connected to a pin 407 the top of the actuating rod 313. The actuating arm in the example is attached to the actuating element 413 at pin 417 and pin 401 so that the "up and down" movement of the actuating rod 313 causes the "side-to-side" movement of the pin 401 which, in turn, corresponds to the "up and down" movement of the locking bolt 316.

Mounting holes such as 323 are positioned at locations as shown to enable solid mounting to the trailer door 103. It is noted that if an upward force is exerted upon the locking bolt 316, the locking bolt will not be able to be fully retracted into the locking device 101, although an unlock signal applied to the valve 122 will still be effective to enable the application of air pressure to the cylinder 311 causing the extension of the actuating rod 313 and the movement of the pin 401 to the left, which, in turn, will cause the lifting of the locking bolt out of the locked position to the unlocked position as shown in FIG. 3 and FIG. 5. The illustrated exemplary embodiment also includes sleeve guides 409 and 411 which are arranged to guide the movement of the locking bolt 316. The guides may be welded or otherwise attached to the back plate of the locking device.

FIG. 5 shows the positions of the pin 401, actuating elements 413 and 415, actuating rod 313 and actuating arm 315 when the locking device is in an "open" or unlocked position. The electro-pneumatic valve 122 used in the exemplary embodiment is commercially available from "Humphrey's" in Kalamazoo, Michigan. The transmitter and receiver 209 are commercially available from "Linear Corporation" and the air cylinder 311 is a "Bimba" brand air cylinder. The models numbers and sizes vary according to the particular needs of the individual application.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. For example, other fluids may be substituted for air in actuating the locking device. Accordingly, the present invention is not intended to be limited to the specific form set forth herein, but to the contrary, it is intended to cover such alternatives, modifications, and equivalents, as can be reasonably included within the spirit and scope of the invention.

What is claimed is:

1. A locking device comprising:

fluid control means arranged to receive a supply of pressurized fluid, said fluid control means being responsive to an operating signal for controlling an application of the pressurized fluid in accordance with said operating signal; and a locking apparatus coupled to said fluid control means, said locking apparatus being responsive to said application of said pressurized fluid for operating said locking device in accordance with said operating signal, said locking apparatus further including:

a locking bolt arranged to be selectively moved along a locking path between locked and unlocked positions;

an actuating device; and an actuating assembly coupled between said actuating device and said locking bolt, said actuating assembly being arranged to selectively cause an insertion of at least a portion of said actuating assembly into said locking path to prevent movement of said locking bolt from said locked to said unlocked positions, said actuating device being responsive to said pressurized fluid for effecting an application of an actuating force to said actuating assembly, said actuating assembly being responsive to said actuating force for effecting a removal of said portion of said actuating assembly from said locking path, said actuating assembly being further operable in response to said actuating force to effect a movement of said locking bolt from said locked to said unlocked position.

2. The locking device as set forth in claim 1 and further including:

mounting means for mounting said locking device to an access door, said locking device being selectively operable for locking and unlocking said access door in accordance with said operating signal.

3. The locking device as set forth in claim 2 wherein said locking device is mounted on an inside surface of a cargo access door, said cargo access door being arranged to provide controlled access to a cargo container.

4. The locking device as set forth in claim 1 wherein said actuating assembly is positioned in said locking path to prevent movement of said locking bolt.

5. The locking device as set forth in claim 4 and further including a spring loaded device, said spring loaded device being arranged to apply a biasing force to said locking bolt to urge said locking bolt to said locked position, said application of said pressurized fluid being effective to overcome said biasing force to effect a movement of said locking bolt to said unlocked position.

6. The locking device as set forth in claim 1 wherein said actuating device comprises an actuating rod driven by said pressurized fluid.

7. The locking device as set forth in claim 6 wherein said actuating assembly comprises a series of movable elements coupled between said actuating rod and said locking bolt.

8. The locking device as set forth in claim 1 and further including:

a signal generating device coupled to said fluid control means, said signal generating device being selectively actuated for providing said operating signal.

9. The locking device as set forth in claim 8 wherein said signal generating device is arranged for selective actuation by an operator.

10. The locking device as set forth in claim 8 wherein said signal generating device includes a wireless remote control unit, said wireless remote control unit being selectively actuated to provide said control signal.

11. The locking device as set forth in claim 10 wherein said wireless remote control unit is selectively actuated by an operator.

12. The locking device as set forth in claim 1 wherein said fluid is air.

13. The locking device as set forth in claim 1 wherein said application of pressurized fluid is removed after a predetermined time period.

14. A method for controlling a locking device, said method comprising:

providing a bolt locking assembly for use on an access door;

providing an actuating mechanism; and arranging said bolt locking assembly and said actuating mechanism whereby said actuating mechanism is selectively usable to apply pressurized fluid to said bolt locking assembly to selectively lock and unlock said access door, said bolt locking assembly further including:

a locking bolt arranged to be selectively moved along a locking path between locked and unlocked positions;

an actuating device; and an actuating assembly coupled between said actuating device and said locking bolt, said actuating assembly being arranged to selectively cause an insertion of at least a portion of said actuating assembly into said locking path to prevent movement of said locking bolt from said locked to said unlocked positions, said actuating device being responsive to said pressurized fluid for effecting an application of an actuating force to said actuating assembly, said actuating assembly being responsive to said actuating force for effecting a removal of said portion of said actuating assembly from said locking path, said actuating assembly being further operable in response to said actuating force to effect a movement of said locking bolt from said locked to said unlocked position.

15. The method as set forth in claim 14 wherein said pressurized fluid is air.

* * * * *